No. 702,568. Patented June 17, 1902.
T. LANSTON.
COMPOSING MECHANISM FOR TYPE MACHINES.
(Application filed Mar. 6, 1901.)
(No Model.) 10 Sheets—Sheet 3.
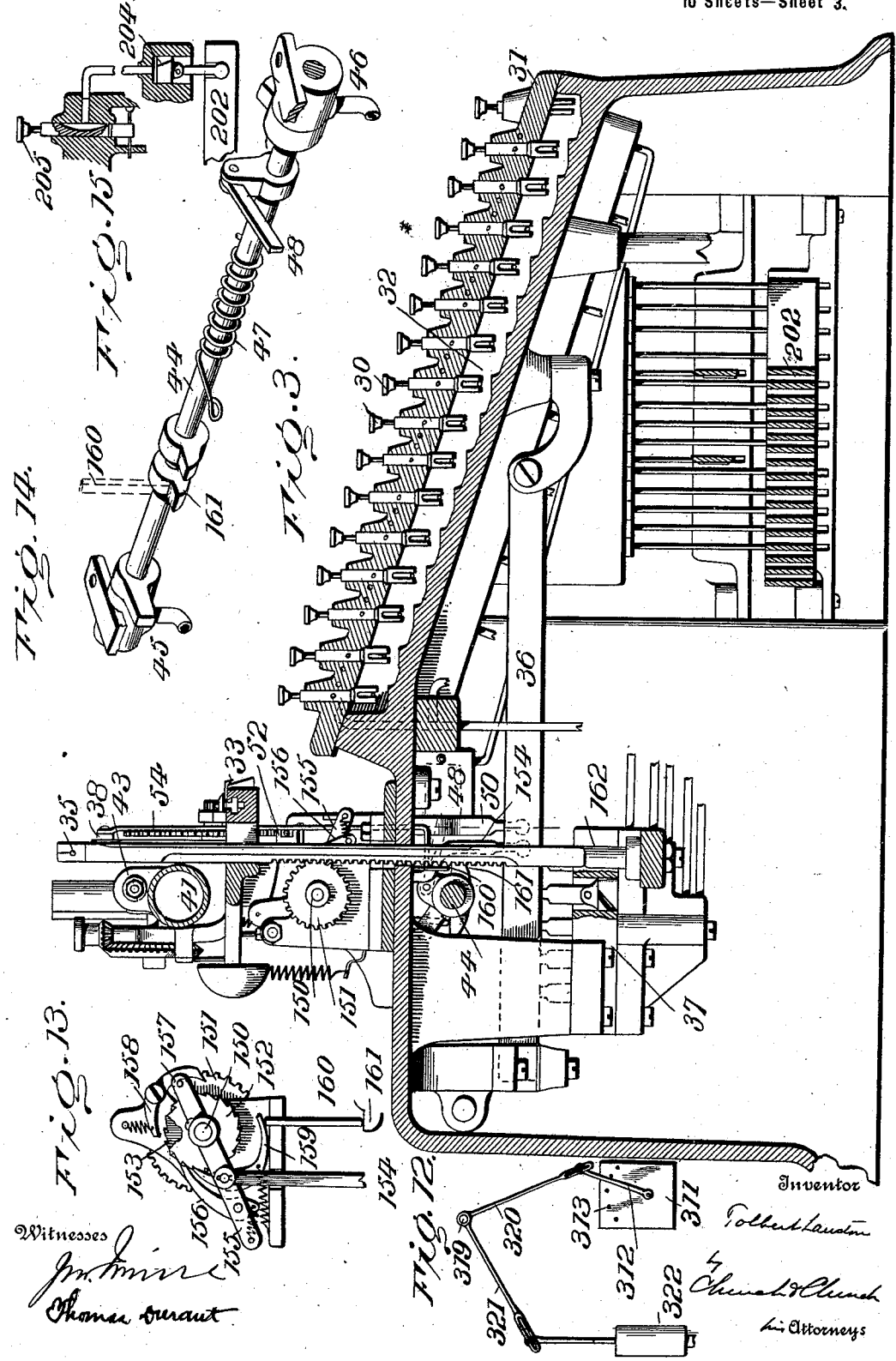

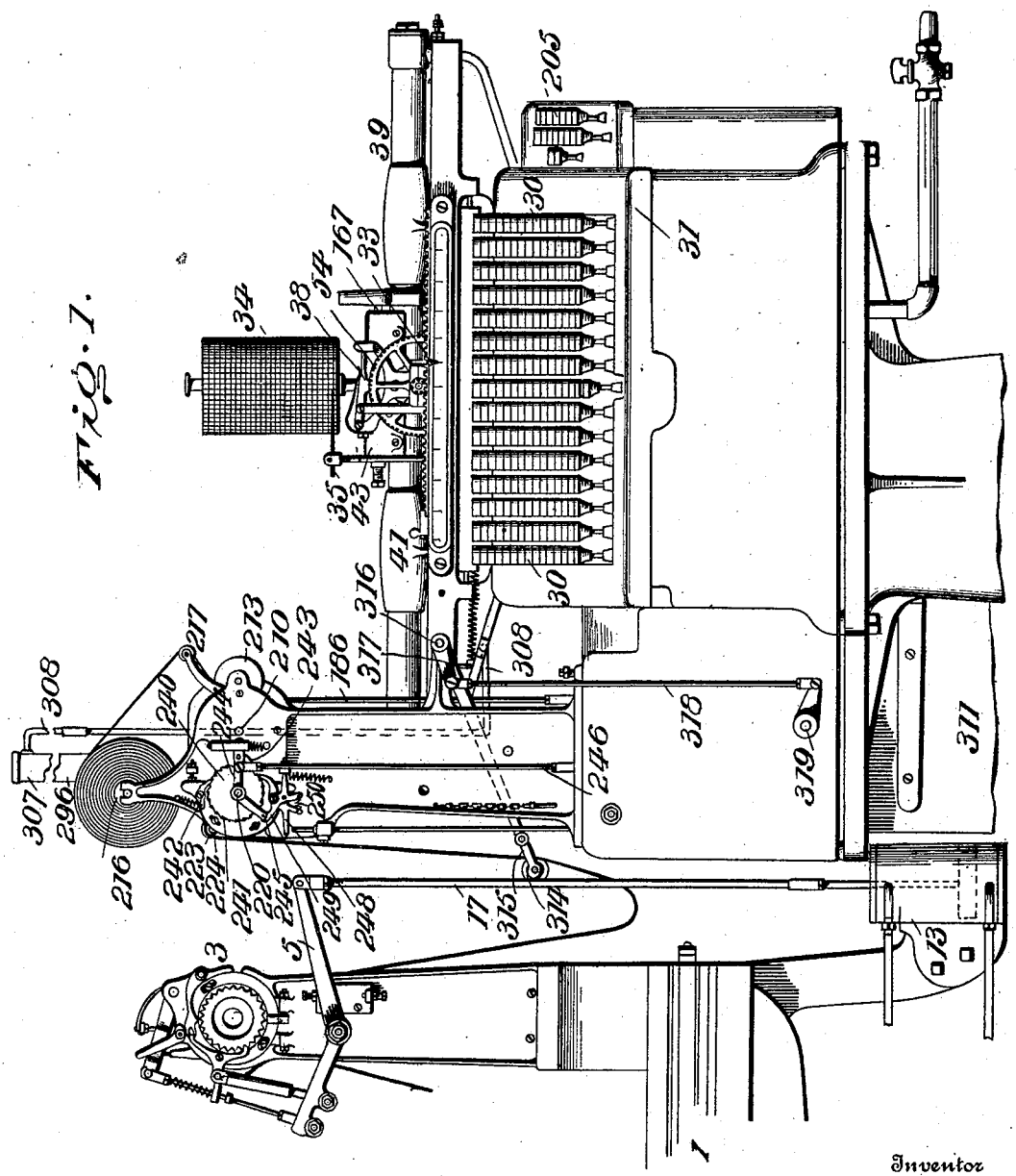

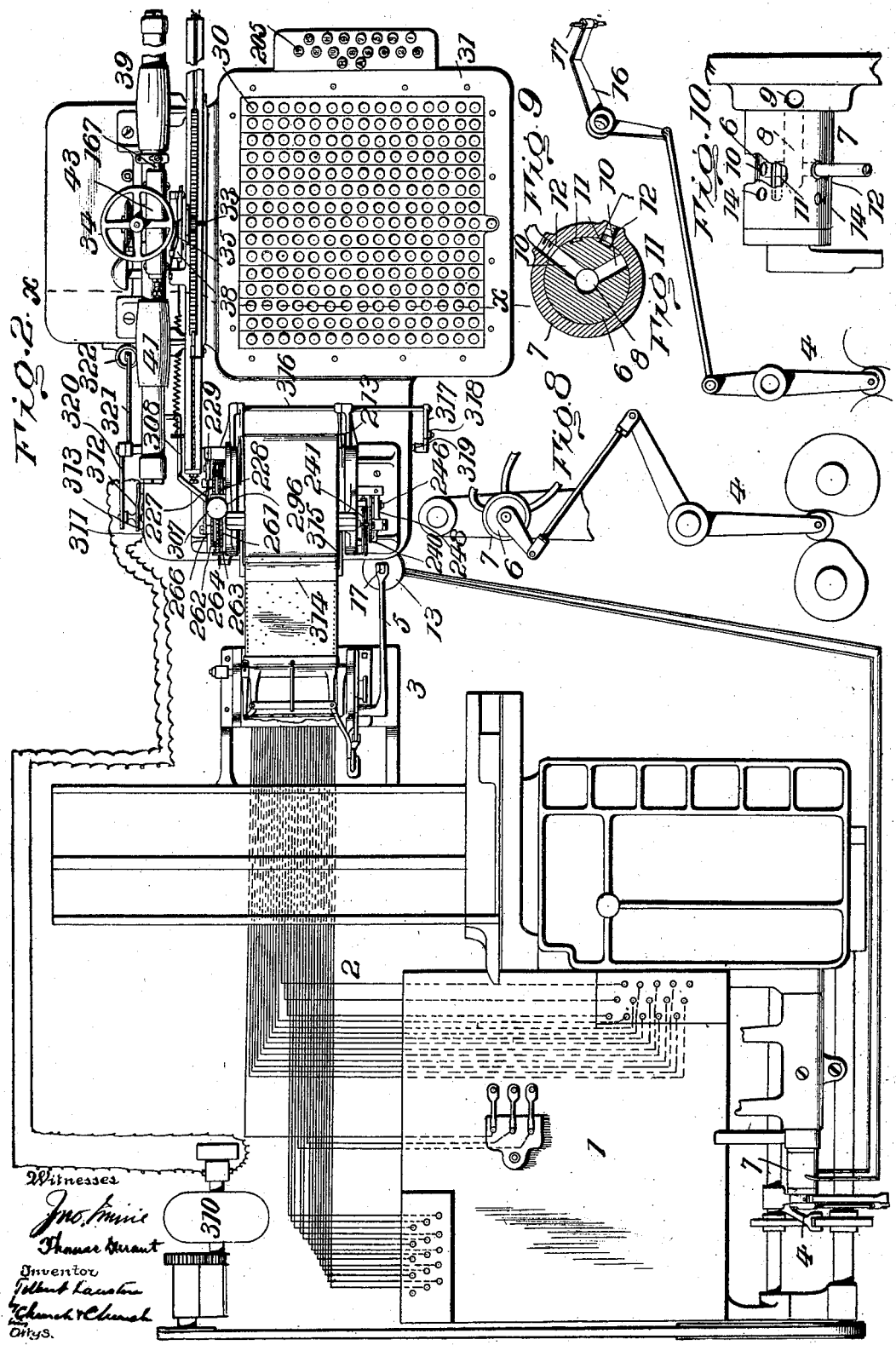

No. 702,568. Patented June 17, 1902.
T. LANSTON.
COMPOSING MECHANISM FOR TYPE MACHINES.
(Application filed Mar. 6, 1901.)
(No Model.) 10 Sheets—Sheet 4.
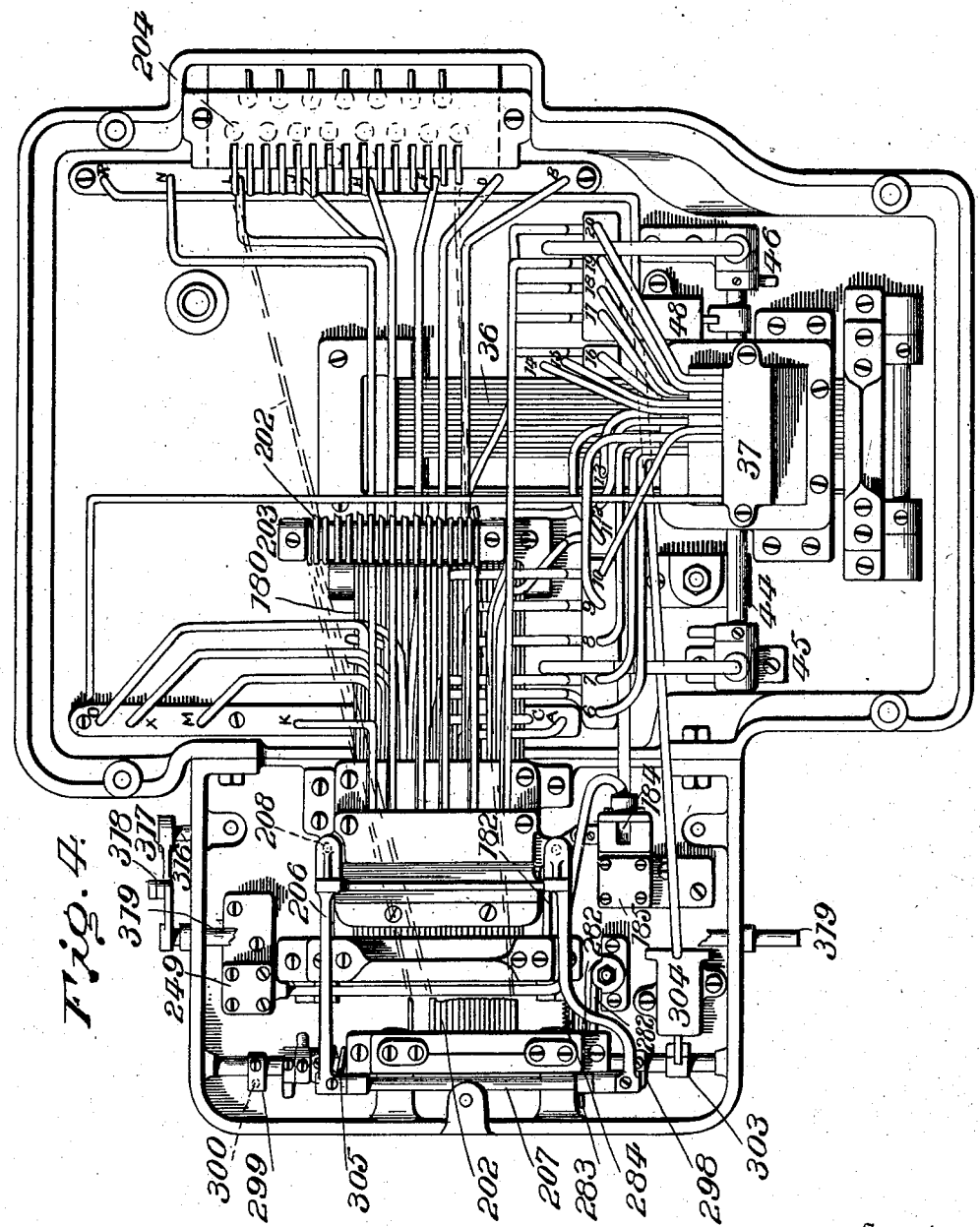

No. 702,568. Patented June 17, 1902.
T. LANSTON.
COMPOSING MECHANISM FOR TYPE MACHINES.
(Application filed Mar. 6, 1901.)
(No Model.) 10 Sheets—Sheet 5.
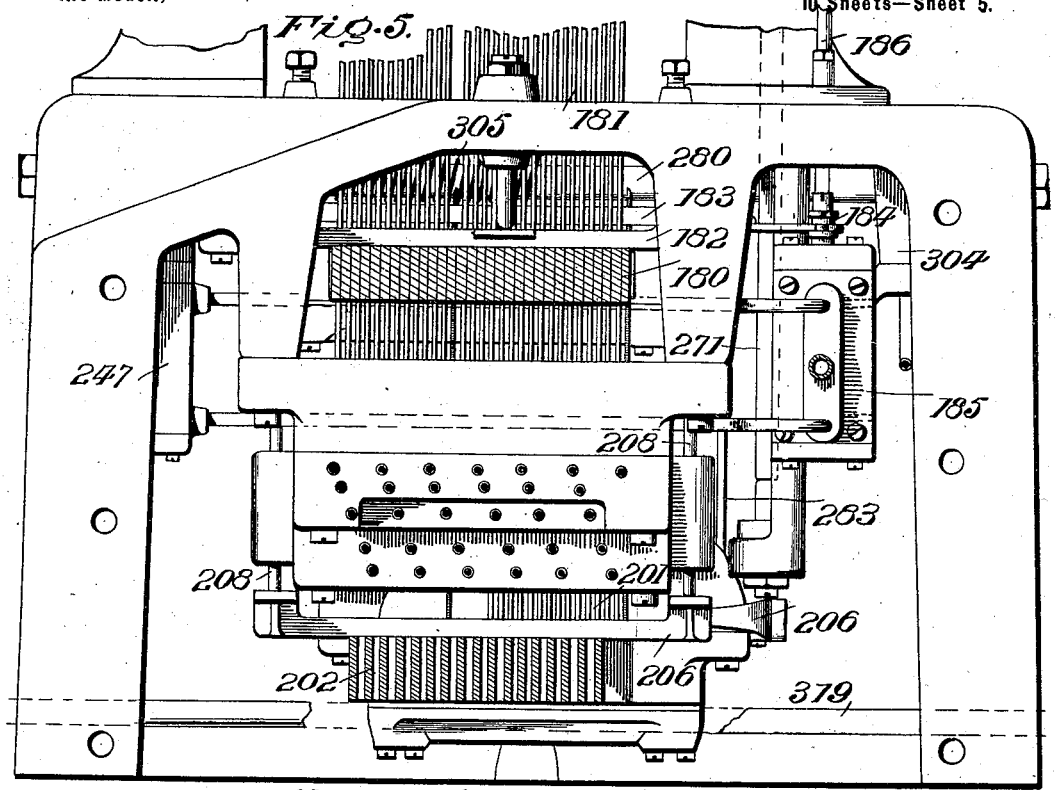
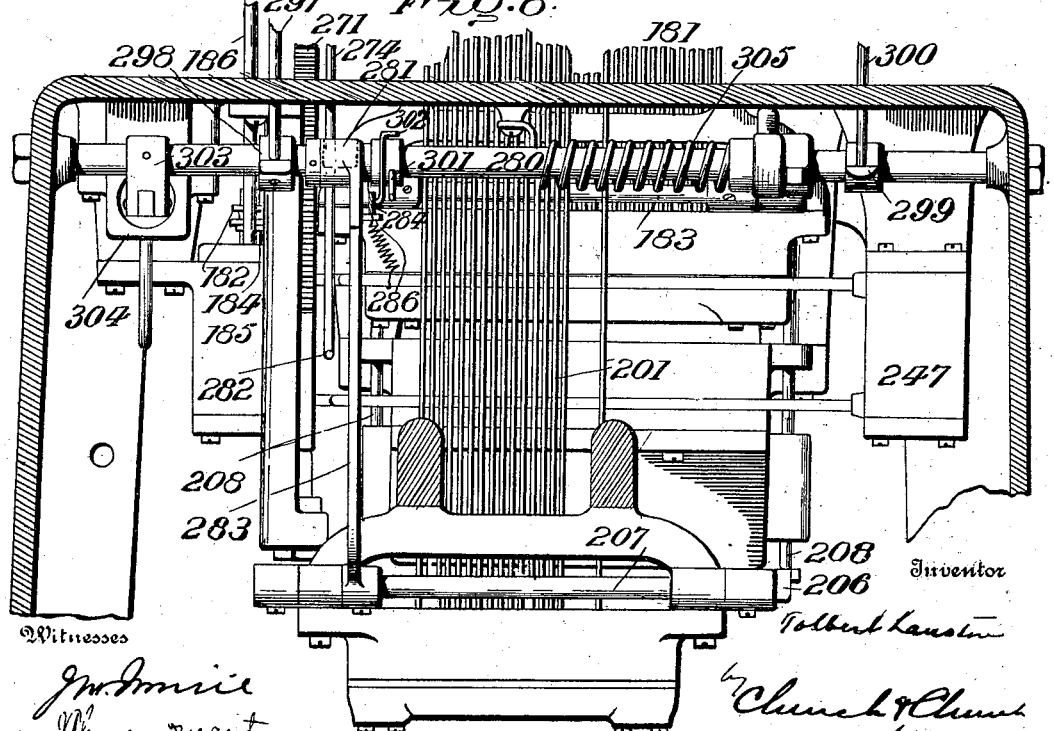

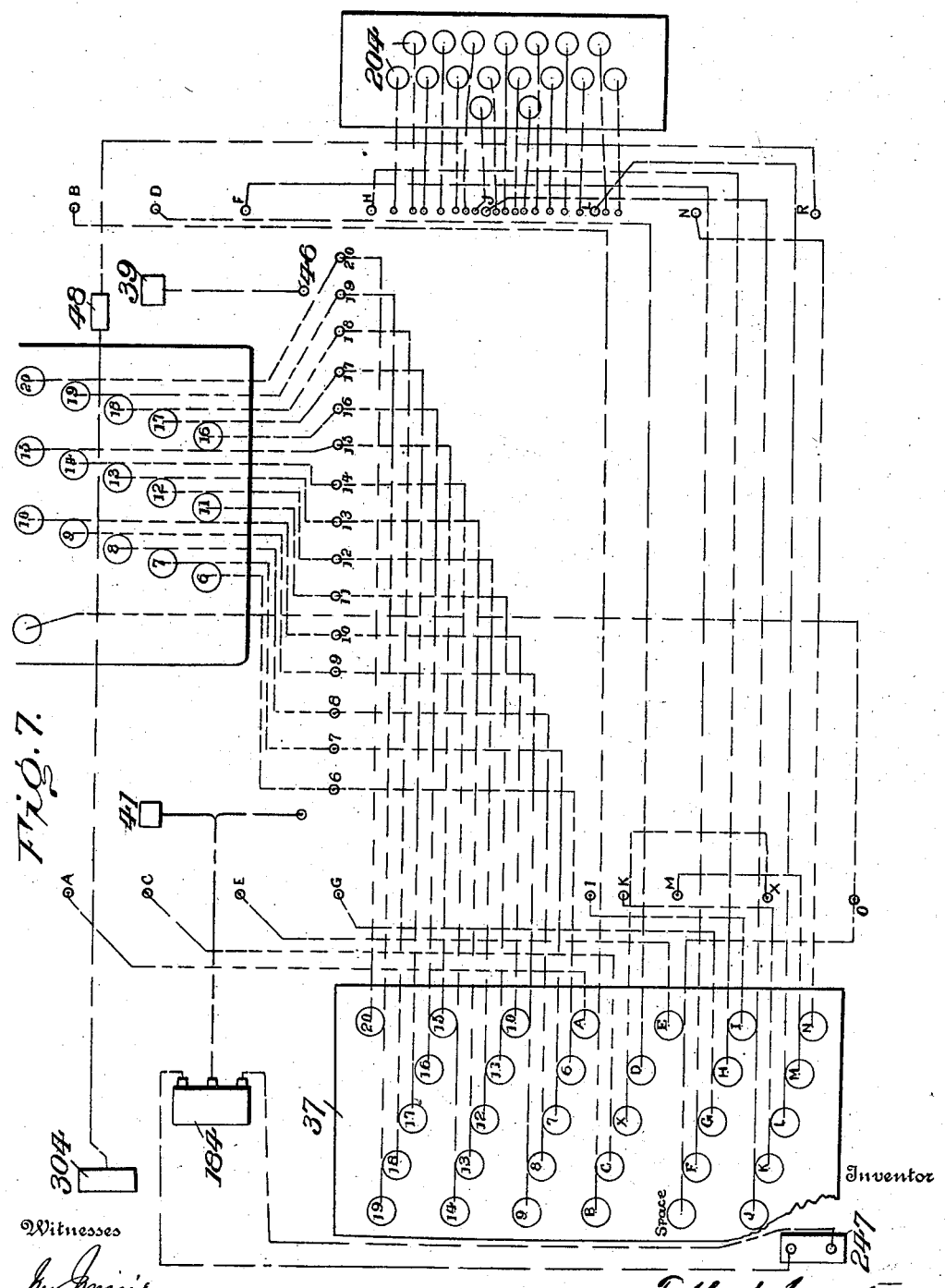

No. 702,568. Patented June 17, 1902.
T. LANSTON.
COMPOSING MECHANISM FOR TYPE MACHINES.
(Application filed Mar. 6, 1901.)
(No Model.) 10 Sheets—Sheet 7.
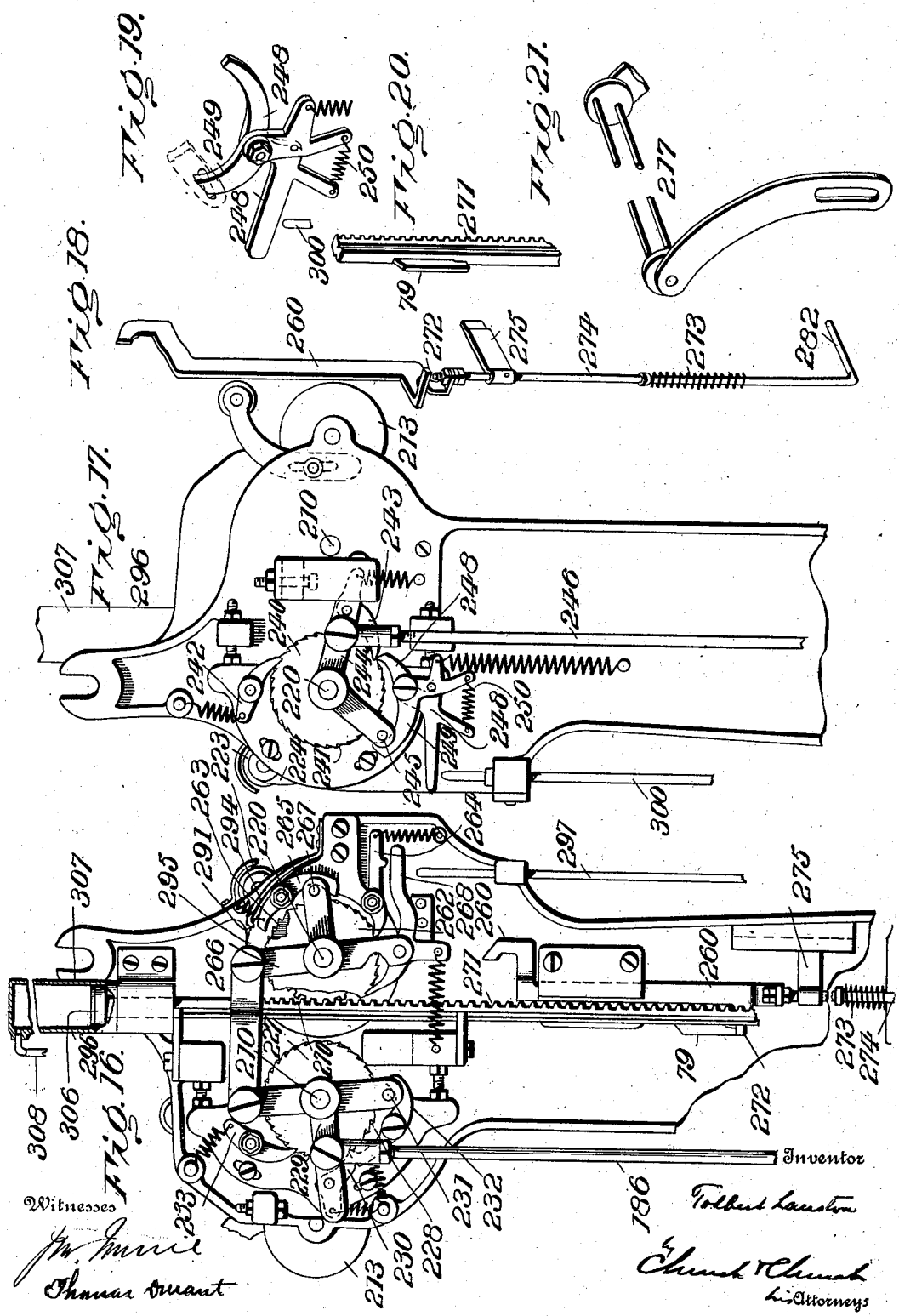

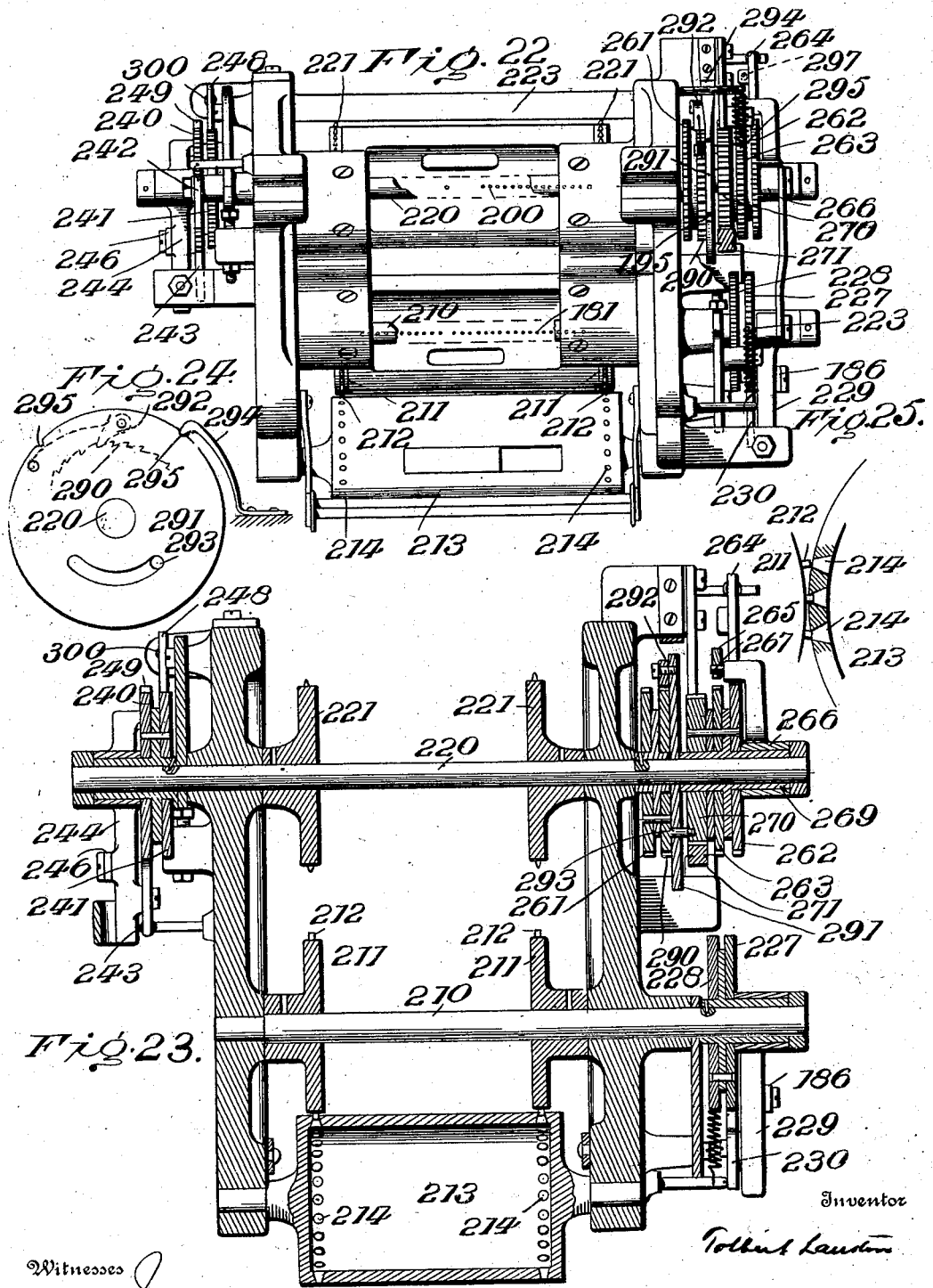

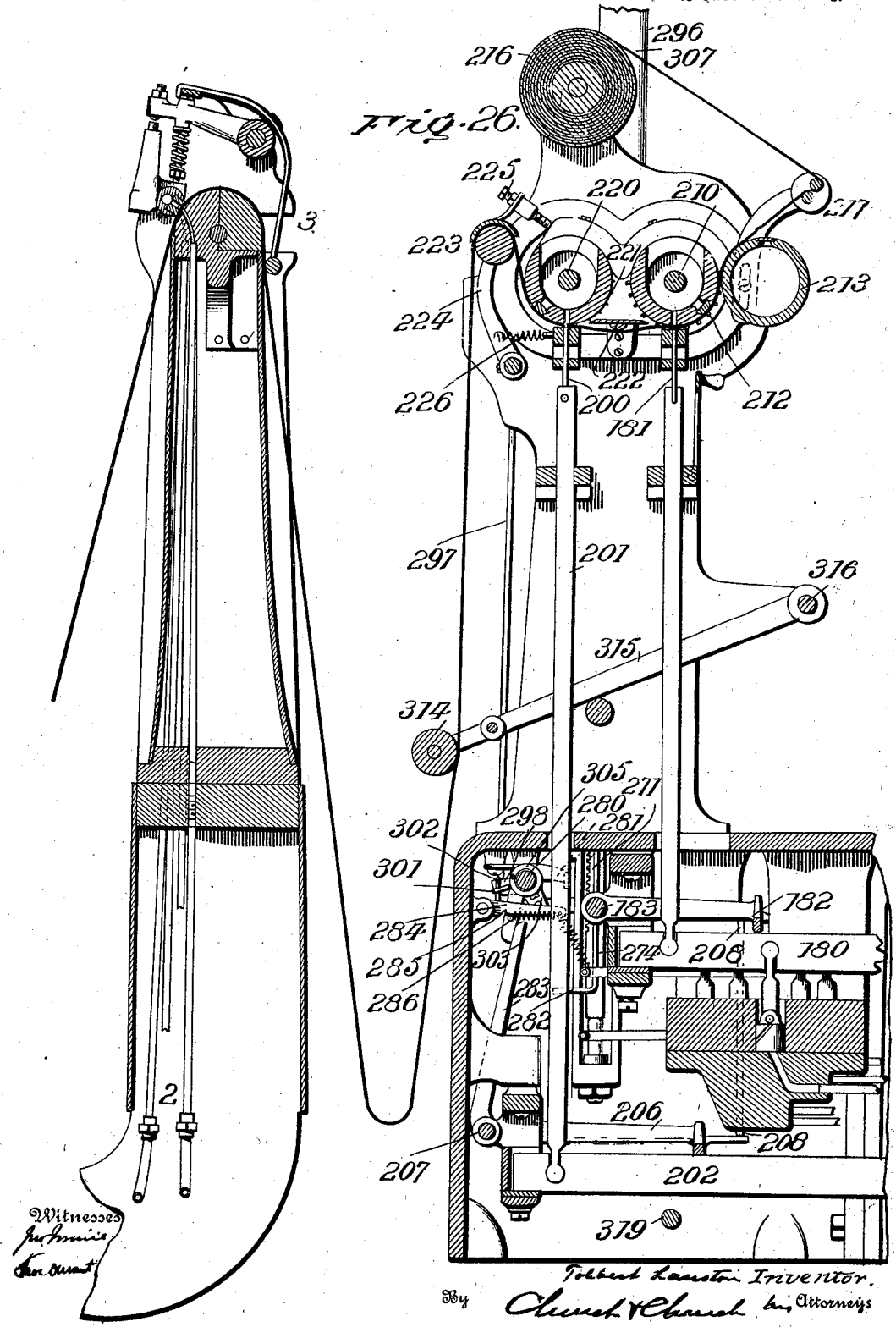

No. 702,568. Patented June 17, 1902.
T. LANSTON.
COMPOSING MECHANISM FOR TYPE MACHINES.
(Application filed Mar. 6, 1901.)
(No Model.) 10 Sheets—Sheet 10.
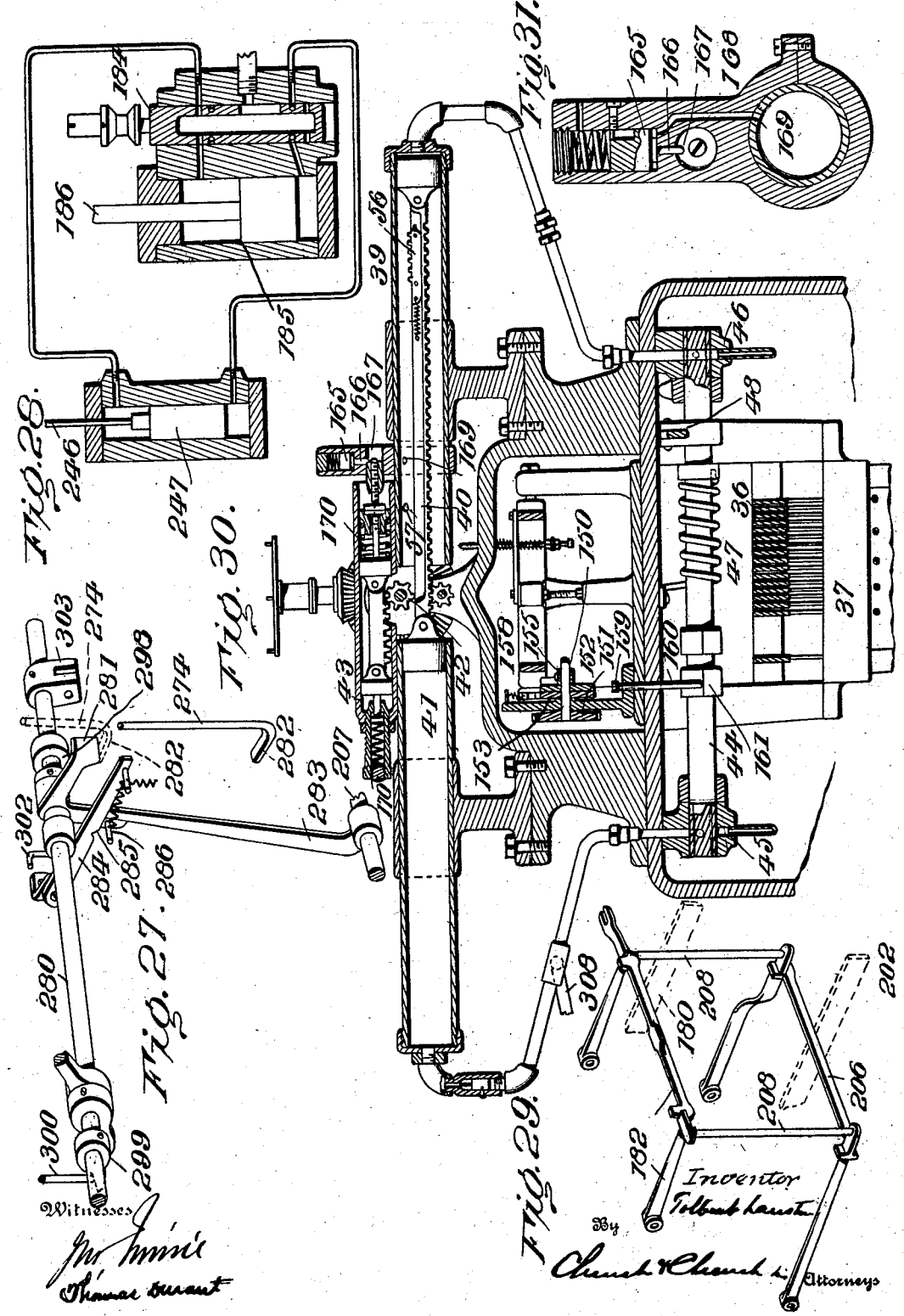

UNITED STATES PATENT OFFICE.

TOLBERT LANSTON, OF WASHINGTON, DISTRICT OF COLUMBIA, ASSIGNOR TO LANSTON MONOTYPE MACHINE COMPANY, OF WASHINGTON, DISTRICT OF COLUMBIA, A CORPORATION OF VIRGINIA.

COMPOSING MECHANISM FOR TYPE-MACHINES.

SPECIFICATION forming part of Letters Patent No. 702,568, dated June 17, 1902.

Application filed March 6, 1901. Serial No. 50,107. (No model.)

*To all whom it may concern:*

Be it known that I, TOLBERT LANSTON, a citizen of the United States, residing at Washington, in the District of Columbia, have invented certain new and useful Improvements in Composing Mechanism for Type-Machines; and I do hereby declare the following to be a full, clear, and exact description of the same, reference being had to the accompanying drawings, forming a part of this specification, and to the figures and letters of reference marked thereon.

This invention relates generically to type casting and composing machines for the production of justified lines of type according to the Lanston and analogous systems, and specifically to the keyboard or composing mechanism for producing a perforated record strip or controller for governing the casting mechanism. Heretofore the keyboard or composing mechanism has existed as a detached adjunct of the casting or type-making mechanism, and one of the principal objects of the present invention is to unite the functions of these two machines in a single connected mechanism. With this end in view a reorganization and improvement has been made in the composing mechanism whereby the justification-punches, although actuated at the close of the line, as heretofore, are caused to operate upon the strip at the beginning instead of at the end of the line and the perforated strip as it emerges from the composing-machine is conducted directly to the paper-feed or other receiving member of the controlling system pertaining to the casting-machine. In order to harmonize the working of the two mechanisms thus connected through the controlling record-strip and to prevent accidental rupture of the latter should the speed of the casting-machine exceed that of the operator at the keyboard, a speed-controller is connected to the casting-machine and arranged to be operated by the record-strip or keyboard mechanism so as to adjust the speed of the casting-machine to that of the operator at the keyboard whenever the available record-strip is reduced to or below a predetermined quantity and to arrest the casting-machine before a rupture of the strip can take place in the event the action of the keyboard is suspended while the casting-machine continues in operation.

Incidentally the invention includes a composing or keyboard mechanism embodying among other novel features a series of justification-punches and a paper-feed therefor separate from and located in rear of the series of character-punches and its paper-feed, both of said series of punches and the feeds therefor being controlled from the keys; a variable actuating mechanism for the said two feeds—character and justification—competent to effect a feed movement of the paper opposite the character-punches each time a punching is performed by either series of punches and to effect a similar feed movement opposite the justification-punches each time a punching is performed by the latter and for so many punchings of the character-punches as are required to advance the justification area into proper relation to the justification-punches, so that during the setting up of the line on the strip the latter will be automatically advanced to present its justification area in position to receive the justification-punches at the front instead of at the rear end of the line; a take-up or draw-off mechanism operating upon the strip to withdraw the surplus from between the two feeds resulting from the excess of motion of the character-feed as compared with the justification-feed, thereby reëstablishing the initial adjustment of the parts; a perforating attachment for forming the marginal feeding-perforations; a pneumatic lock for the indicating devices, and numerous details of construction and arrangement of parts, all as hereinafter more fully described, and pointed out in the claims.

In the drawings representing the preferred form of embodiment of the invention, Figure 1 is a front elevation of the new keyboard with a section of the casting-machine, showing the connection. Fig. 2 is a top plan view of the keyboard, the casting-machine being represented diagrammatically. Fig. 3 is a vertical section on the line *x x*, Fig. 2. Fig. 4 is a bottom plan view of the keyboard, the levers for the justification-punches being broken away. Fig. 5 is a side elevation of the keyboard with the punch-frame removed. Fig. 6 is a side elevation of the punching mechanism, the frame being broken away to disclose the interior mechanism. Fig. 7 is a diagrammatic view of the pneumatic or power connections. Fig. 8 is a detail of the valve mechanism for operating the paper-feed of the casting-machine. Fig. 9 is a transverse section, and Fig. 10 is a side elevation, partly in section, of the controlling-valve, Fig. 8. Fig. 11 is a modified form of actuating device for the paper-feed. Fig. 12 is a diagrammatic view of a rheostat used as a speed-controller for the casting-machine. Fig. 13 is a detail of the space-type counter actuating mechanism. Fig. 14 is a perspective view of the reversing cross-shaft with trip connections. Fig. 15 is a sectional detail of a justifying-key, punch-lever, piston, and cylinder. Fig. 16 is a side elevation of the paper-feeds for characters and justification. Fig. 17 is a similar view of the opposite side. Fig. 18 is a detail of the lock-out for the justification-feed. Fig. 19 is a perspective view of the holding and trip pawl for the justification-feed. Fig. 20 is a detail of the take-up rack. Fig. 21 is a detail of the paper-tension. Fig. 22 is a top plan view of the character and justification feeds. Fig. 23 is a horizontal section in the plane of the shafts, Fig. 22. Fig. 24 is a detail showing the slotted pawl-carrier. Fig. 25 is a detail of the punching device for the feed-perforations. Fig. 26 is a transverse vertical section through the paper-feed of the casting-machine and the punching and feeding devices of the keyboard. Fig. 27 is a detail of the trip-operating shaft and connections for the holding-pawls of the paper-feed. Fig. 28 is a diagrammatic view showing the relation of the two feed-actuating pistons and the control-valve therefor. Fig. 29 is a detail view showing the connection between the rocking frames belonging to the two series of punches. Fig. 30 is a longitudinal sectional view of the motor and return cylinders for the units-wheel and the supplemental motor for the justification-chart, showing the pneumatic lock. Fig. 31 is a transverse section through the locking-pin with passage connecting its cylinder and the motor-cylinder of the units-wheel.

Similar characters designate like parts in the several figures.

The new union machine illustrated in the drawings includes as its principal elements a casting and composing mechanism of the type described in Patent No. 625,998, a new composing or keyboard mechanism, (patterned after that of Patent No. 654,115, although modified and improved in numerous particulars, as will hereinafter appear,) and a speed-control connection intermediate the said mechanisms, through which the perforated record-strip operates to govern the speed of the casting mechanism. For convenience of description these will be considered in the order stated.

First as to the casting mechanism. The form illustrated is typical and preferred because of its demonstrated capacity. As its general construction is well known and substantially identical with that of Patent No. 625,998, a detail description is not required. It is indicated in the drawings only by the diagrammatic representation of the bed-plate 1, air-connections 2, and paper-feed mechanism 3 in Fig. 2 and by a section of the bed-plate with paper-feed attached in Figs. 1 and 26. The only material change in this element is as to the location of the paper-feed, its air connections and driving mechanism, the first of those being changed from the rear to the front of the machine, so that the keyboard operator will be within easy reach of the galley and belt-shipping lever and can thus readily oversee the casting-machine while operating the keyboard. The pneumatic connections, as well as those for transmitting motion from the main actuating-lever 4 to the feed-actuating lever 5, must of course be modified to accord with this change in location. A competent pneumatic connection is illustrated in Figs. 1, 2, 8, 9, and 10 and a mechanical substitute in Fig. 11. The first utilizes the main feed-actuating lever 4 of the machine to oscillate a valve 6, contained in a casing 7, fixed to the frame. This valve is furnished with a chamber 8 in open communication with a pressure-supply through a port 9 in the casing and two supply-ducts 10 and two exhaust-ducts 11. The casing contains two ports 12, leading to opposite ends of a cylinder 13, Fig. 1, and two exhaust-ports 14, one in line with each supply-port 12. When at either extreme of its motion, one of the supply-ducts 10 will coincide with the port 12, leading to one end of cylinder 13, while the opposite end of said cylinder will be placed in open communication with its exhaust-port 14 through the duct 11. The piston within cylinder 13 is connected to the actuating-lever 5 of the paper-feed by a rod 17, as seen in Fig. 1, and thereby motion is communicated to the air-bar and feeding devices. The mechanical transmission shown in Fig. 11 contemplates the location of the cams on the ends of the driving-shafts, in which case the motion of the main actuating-lever is communicated to a bell-crank 16 or other form of lever engaging a rod 17, connected to the actuating-lever 5.

Next as to the composing or keyboard mechanism or that by which the record-strip is prepared and presented directly to the casting mechanism without having to be first reversed, as was heretofore generally the case in machines of this kind. The new record-strip-composing mechanism or keyboard is patterned somewhat after that of Patent No. 654,115—that is to say, it is pneumatically actuated and utilizes several of the elemental features of the prior machine, and in order to more clearly distinguish the new from the old the latter will be first briefly adverted to, after which the modifications, additions, and improvements will be more fully described. The keyboard proper, including in that term the valved finger pieces or keys 30, Figs. 1, 2, and 3, pressure-chamber 32 and its top plate 31, containing air-ducts, but excluding the two rows or lines of justification-keys, is identical both in construction and arrangement with that of the prior patent. The keys of each column represent type of the same width, and the different columns different widths, each column being represented by an air-duct (numbered 6 to 20, inclusive, Figs. 4 and 7) to which pressure is admitted when any of the keys is depressed. The location of individual type in each column is determined by the transverse line in which it is situated and is represented by an air-duct (lettered A to N, inclusive, and X) also controlled by the key situated at the intersection of the line and column. The duct marked O is controlled by the justifying space-key alone and that marked R by the resetting-key.

The indicating devices of the prior patent are also retained. These include the reciprocating line-indicator 33, Figs. 1, 2, and 3, the rotary justification-chart 34, the vertically-movable pointer 35, and the units mechanism. With the exception of the actuating mechanism for the pointer 35 and the addition of a lock for the chart-carrying devices the operating mechanism for the indicating devices is also the same and includes the series of pivoted operating-levers 36, Figs. 3 and 4, each provided with a piston working in one of a series of cylinders in block 37 and to which air is admitted from one of the ducts 6 to 20, a series of stop-bars 50, Fig. 3, one for each lever 36, acting upon a units-rack (not shown) and the holding-pawl 38 to release the units-wheel 54 and measure its advance movement, the motor 39, Fig. 30, and motor-rack 40 for advancing the units-wheel, the resetting-motor 41, a supplemental rack 56, carried by the motor-rack 40 in position to engage a pinion 42 in the train of gears carrying the justification-chart, the supplemental motor 43 for assisting the advance of the justification-chart, and the resetting cross-shaft 44, with its valves 45 and 46, for controlling the admission and exhaust of pressure in motor 39 and resetting-motor 41, said cross-shaft being operated in one direction by its spring 47, Fig. 14, and in the opposite direction by a motor 48, Figs. 3 and 4, to which air is admitted from duct R, Fig. 7, when the resetting-key is depressed. The actuating devices for the pointer 35, instead of being located within the inclosed base, where access is difficult, are arranged above the top plate of the frame, (see Figs. 3 and 13) and comprise a shaft 150, carrying a gear 151, in engagement with the rack on the pointer, and two relatively reversed ratchet-wheels 152 and 153. That one of the operating-levers 36 whose cylinder is connected to the space-duct O, Fig. 7, carries a rod 154, whose upper end is attached to an arm 155, pivoted upon shaft 150 and carrying a driving-pawl 156, engaging ratchet-wheel 152, and a pin 157 for engaging the tail of a stop-pawl 158, the latter engaging the other ratchet-wheel 153 and being brought into action at the end of the feeding movement of pawl 156 to arrest the advance and prevent overthrow. This pawl 158 is normally out of contact with its ratchet-wheel and is thrown into engagement therewith only at the end of the stroke of arm 155. A holding-pawl 159 is pivoted upon the frame, with its tail above or in position to be operated upon by a rod 160, the latter extending down in position to be engaged by an arm 161, Fig. 14, on the resetting cross-shaft 44, so that when the latter is moved to admit pressure to the resetting-motor the holding-pawl 159 will be withdrawn and the pointer 35 permitted to drop by gravity until it rests upon the stop 162. Another new feature of this indicating mechanism is the lock for preventing the rebound or displacement of the justification-indicator when the units-rack is reset or brought back to initial position. Working within a cylinder in the frame is a piston 165, Figs. 30 and 31, carrying a pin 166, the latter arranged to intercept an adjustable member or nut 167, carried by the rack forming part of the supplemental motor device 43. The adjustable member 167 is provided with an incline and a retaining-surface, and the pin 166 is projected into its path by a spring, so that as the supplemental motor is retracted or the justification-chart returned to zero position the member 167 will pass the pin 166 and permit the latter to engage the retaining surface or end, thereby holding the parts against movement until the pin is withdrawn. To effect this action, the cylinder of piston 165 is connected by a duct 168 with the interior of the cylinder of motor 39, the port 169 therein being located slightly in advance of the port communicating with the supplemental motor 43, so that as the piston of motor 39 advances it will uncover port 169 and admit pressure to raise pin 166 out of the way just before admitting pressure to the supplemental motor. Another source of defective action, that incident to hammering, is overcome by the application of cushion-springs 170 to opposite ends of the supplemental motor-rack.

It is to be noted that whereas in the prior machine the operating-levers 36 performed the double function of operating the punches as well as the indicating devices, in the present machine they are used only in connection with the indicating mechanism, a separate series of operating-levers 180, Figs. 4, 5, and 26, being employed for the character-punches 181, which latter, together with the coöperating die-plate, are in all material respects the same as those of the prior machine, with this exception: that they are located to one side of the keys and indicating devices and in proximity to the paper-feed of the casting-machine, as best seen in Figs. 1 and 2, and, further, that they here merely represent the location of the characters, spaces, points, &c., on the die-plate of the casting-machine and the keys of the keyboard, an entirely independent series of punches being employed for setting the justification, as will presently appear.

The series of punches 181, hereinafter designated the "character-punches," are thirty-one in number and represent the fifteen degrees of motion of the die-case in transverse planes corresponding with the fifteen columns and fifteen rows of keys on the keyboard and the justifying-space punch controlled separately by the space-key through duct O. The pneumatic or power connections will be readily understood from Fig. 7, wherein the punch-pistons to the left of the figure are marked with characters and numerals corresponding with the ducts leading from the columns and lines of keys. From an inspection of this figure it will be seen that the ducts 6 to 20, inclusive, designating columns of keys, hence size of type, are in pneumatic communication through proper pipes or passages with the corresponding cylinders of the two sets of indicating and punch-operating levers 36 and 180 and that the justifying-space duct O is also in communication with its indicating and pointer-actuating operating-lever 36 and punch-operating lever 180, whereas the ducts A to N and X, which designate the lines or position in column, but not size, communicate alone with the punch-cylinders.

Above the series of character-punch-operating levers 180 is the rocking frame 182, mounted upon shaft 183 and connected to the feed-valve 184, Figs. 4, 5, 6, and 28, for controlling the inlet and exhaust of pressure in opposite ends of the feed-cylinder 185, containing the piston on the paper-feed-operating rod 186, all as found in the prior machine referred to.

The machine as thus far described constitutes an operative keyboard or composing mechanism for producing character-locating perforations in the record-strip and indicating the amount of line occupied and the justification required to fill the line, and it is shown and described herein merely as a representative of a type of machine possessing such capacities and adapted to coöperate with the novel features about to be explained.

No provision has thus far been made for the justification-perforations or those for establishing the dimensions of the space-type occurring in the line. In some forms of casting-machines a single set of perforations is or may be employed for setting the justifying mechanism, usually one for designating justification and the other for measuring the degree, but in the preferred machine (that of Patent No. 625,998) two such sets of perforations are employed for designating the individual justification-wedges and determining their position of adjustment; but no matter which arrangement is adopted the justification-perforations occupy the same position with respect to the character-perforations—that is, at the beginning of the line of composition as set up in the casting-machine. Heretofore it has been customary to locate justification at the end of the line, necessitating the reversal of the record-strip and the setting up of the type in the reverse order of composition and rendering it impracticable to deliver the record-strip as composed directly to the casting-machine. According to the present invention these obstacles have been overcome by the provision of a second or separate series of punches, locating them at a point in rear of the character-punches—that is, between the latter and the casting-machine—and providing a feeding mechanism competent to present the space at the beginning of the line of character-perforations in position to receive the justification-punches after the series of character-perforations for the line have been produced. A form of mechanism embodying these features is shown in the drawings and will now be described.

Supported in guides in rear of the character-punches 181 is a second series of punches 200. (Best seen in Fig. 26.) As applied to this particular machine there are seventeen punches in this series, of which fifteen correspond in position with the character-punches designating size—that is, the fifteen degrees of motion of the die-case in one direction—while the other two, designating the justification-wedges, occupy independent positions. The equipment of the punches 200 is similar to that of the character-punches, although the punch-bars 201 are longer, to connect with levers 202, located beneath the level of the operating-bars 180. The levers 202 (best shown in Fig. 4 by dotted lines, the main portion being broken away to uncover the rest of the mechanism) are centrally pivoted at 203 and extend across the machine to a series of pistons 204, one for each lever. The pistons 204 are substantially the same as those which operate the indicating devices and character-punches, but reversed in position, as shown in Fig. 15, so that their stroke is downward instead of upward. The application of pressure to each of these pistons is controlled by a valved key 205, working in a pressure-chamber after the manner of the character-keys. This provides a pneumatic action for the justification-punches; but it is obvious that they might be mechanically or otherwise connected to the keys for action. Each of the series of keys 205, termed "justification-keys," is appropriately marked to designate its value, the indication preferably corresponding with that on the justifying-index, from which latter the operator obtains directions for striking certain keys or combinations of keys to secure justification of the line. Thus, as shown in Fig. 2, two of the keys are marked "A B," respectively, designating the two justification-wedges, and the balance bear figures "6" to "20," inclusive, designating the series of positions of adjustment of the wedges.

In order that the same feed-valve 184 may be utilized for the justification-punches, a rocking bar 206, Figs. 5, 6, 26, and 29, mounted upon a shaft 207, is arranged above the levers 202 and connected to the rocking bar 182 of the character-punch levers through rods 208, resting upon the lower and contacting with the upper rocking bar, Fig. 29, so that the latter may operate independently of the former.

The paper-feeds pertaining to the two series of punches are best shown in Figs. 16 to 26, inclusive. Above the series of character-punches 181 is mounted a shaft 210, to which are secured two wheels or disks 211, located at opposite ends of the punch-die. These wheels are furnished with a series of equally-spaced radial punches 212, and on an axis parallel with shaft 210 is a drum 213, containing radial perforations or dies 214, registering with the punches on wheels 211. Punches 212 serve not only to feed or carry the record-strip past the character-punches by their engagement with the holes in the margins of the strip, but, acting in conjunction with the drum 213, they operate to form the said marginal feeding-perforations, the paper as it is drawn from the supply-spool 216 passing first through a tension device 217, composed in this instance of two parallel rods, and then between the punch-cylinders 211 and drum 213, where the marginal holes are formed and the strip forced onto the punches, which thus become carrying-pins. Parallel with shaft 210 is a second shaft 220, provided with pin-wheels 221 opposite the ends of the die of the justification-punches, and between the two paper-feeding devices is arranged a stripper 222, beneath which the record-strip passes. After leaving pin-wheels 221 the record-strip is conducted over or through a guide 223, mounted upon pivoted arms 224, the latter carrying a set-screw 225, contacting with the frame for adjustment and held to position by a spring 226.

The character-feed is provided with an independent intermitting driving mechanism controlled, primarily, from the character-keys, but responding also to the justification-keys. Such a driving mechanism is illustrated in the drawings, wherein the shaft 210 is provided with reversed ratchet-wheels 227 228. The paper-feed-operating rod 186, whose movements, it will be remembered, are controlled by the valve 184, actuated by rocking bars 182 and 206, pertaining to the character and justification punches, is connected to one arm of a three-armed lever 229, the latter bearing a feed-pawl 230 on one arm and a pin 231 on the other for engagement with a stop-pawl 232. Stop-pawl 232 engages one ratchet-wheel 228 and feed-pawl 230 and holding-pawl 233, the other after the manner of the single paper-feed mechanism of Patent No. 654,115.

The justification-feed is provided with an independent intermitting driving mechanism, also under the control of the character and justification keys, but differing from that of the character-feed in that it is provided with means for withdrawing the stop-pawl and has coöperating with it a lock-out for arresting the feed movement. In the example given there is secured to shaft 220 on the side of the frame opposite that on which the character-feed-driving mechanism is located two reversed ratchet-wheels 240 241. The holding-pawl 242 and the feed-pawl 243 engage one ratchet-wheel 240, while a locking-pawl engages the other, 241. Feed-pawl 243 is carried by a lever 244, pivotally supported on the shaft 220 and provided with a pin 245 for engagement with the locking-pawl, and said lever is actuated through the medium of a rod 246, connected to a piston 247, Fig. 28, the opposite ends of whose cylinder is connected to the feed-valve 184 of the character-feed, so that pressure will be applied to the pistons of the two feed mechanisms simultaneously. The locking-pawl of the justification-feed is composed of two sections 248 249, (see Figs. 17 and 19,) pivotally connected and provided with abutting surfaces and a holding-spring 250. So far as the action of pin 245 is concerned in effecting the engagement of section 248 with the ratchet-wheel the two-part holding-pawl is rigid; but when it is desired to withdraw section 248, and thereby permit shaft 220 to rotate forward, it can be done by applying pressure to the tail of section 248 in a direction to separate the abutting shoulders and extend spring 250. The purpose of this will presently appear.

It is apparent that the two series of punches with their individual feeds working in unison are incompetent to effect the proper location of the justification at the beginning of each line, notwithstanding the placing of the justification-punches in rear of the character-punches, except under one improbable condition—that is, when every line contains exactly the same number of characters and the space intervening between the two sets of punches, measured in feed movements, corresponds with the number of characters in the line—for under such conditions the punching of the line characters would just bring the space at the beginning of the line opposite the justification-punches, and the operation of the latter would effect an advance movement sufficient to reserve a blank space at the beginning of the next succeeding line; but inasmuch as these conditions seldom, if ever, occur in practice, both the number of type in the line and the length of line being subject to variation, provision has been made for delaying or temporarily suspending the action of the justification-feed while all character-perforations in excess of a predetermined number are being produced, restoring its action when justification-perforations are produced and taking up the surplus record-strip after the last-named operation to reëstablish initial conditions. With these ends in view the justification-feed is provided with a lockout, represented in the present instance by the lock-bar 260, Figs. 16 and 18, movable in guides toward and from a toothed wheel 261, fast on the shaft 220 of the justification-feed. This lock-bar is provided with an intermittent feed device for advancing it toward the toothed wheel 261 and is located as many degrees of feed movement distant from said wheel as there are such movements contained in the predetermined standard, which latter is, say, fifteen degrees of feed or the number of feed movements required to advance the paper strip from the character to the justification punches, as determined by the length of feed and the distance between the feed-shafts 210 and 220. The feed device or controller for lock-bar 260 comprises a ratchet mechanism similar to that of the character-feed and is connected to operate in unison with the former—that is to say, it includes reversed ratchet-wheels 262 263, holding-pawl 264, locking-pawl 265, and three-armed lever 266, connected by a link to the lever 229 of the justification-feed and carrying-pin 267 and feed-pawl 268. The lever 266 is pivotally supported upon a sleeve 269, Fig. 23, loose on shaft 220, said sleeve carrying in addition to the reversed ratchet-wheels 262 263 a toothed wheel 270, engaging a vertical rack-bar 271, Figs. 16 and 20. This rack-bar is furnished with a shoulder 79 above and in the path of a projecting arm 272 on lock-bar 260, the latter being raised by a spring 273, engaging a rod 274, carrying guide 275 and adjustably attached to said lock-bar, Fig. 18. The arrangement of the connected driving mechanisms for the character-feed and lock-bar is such that when the actuating-pawl of the former is retracted preliminary to a feed movement the actuating-pawl of the lock-bar mechanism will be advanced, and vice versa, the two having their operating strokes in succession, so that when the feed-pawl of the character-feed is retracted from the normal position (represented in Fig. 16) preliminary to its feeding stroke the rack-bar 271 will be raised one degree. It is clear, therefore, that upon the completion of any predetermined number of strokes of the character-feed the lock-bar 260 may be brought into engagement with wheel 261, thereby locking the latter and the justification-feed against motion. The withdrawal of the lock-bar from engagement with the wheel 261 is requisite to permit the justification-feed to move when the justification-punches are actuated, and provision is made for effecting such withdrawal whenever a justification-key is depressed.

Mounted in bearings within the casing is a shaft 280, Figs. 6, 26, and 27, and upon this shaft is loosely supported a bell-crank lever 281, one arm of which stands above but in the path traversed by a projection 282 on rod 274, engaging the lock-bar, while the other arm bears against an arm 283, carried by shaft 207 of the rocking-bar 206 for the justification-punches. When the lock-bar is in engagement with the wheel 261, the projection 282 is nearly if not quite in contact with the arm of bell-crank 281, (shown in dotted lines, Fig. 27,) so that whenever a justification-key is operated and the rocking-bar 206 elevated the arm 283 will through its engagement with the bell-crank 281 draw the lock-bar down against the resistance of its spring, thereby unlocking the justification-feed and permitting it to be operated.

In connection with the take-up it becomes desirable that the lock-bar when retracted or withdrawn by the action of the justification-keys should be held out of action until the resetting of the indicating mechanism is accomplished, and this result is secured by the employment of a pivoted latch 284, Fig. 27, provided with a shoulder 285 in position to engage a projection 286 on bell-crank 281 when the latter is moved by arm 283 to withdraw the lock-bar.

By suspending the justification-feed and continuing the character-feed in action a loop will be formed in the strip between the two feeds, the length of said loop being equal to the whole series of feed movements minus those participated in by the justification-feed, and as the latter is active only so long as is necessary to bridge the interval between the two feeds (say fifteen feed movements) plus the number required for justification, (say two,) it follows that in order to reëstablish initial conditions the strip must be shifted with respect to the justification-feed a distance equal to this excess of motion on the part of the character-feed resulting in the formation of the loop—say seventeen. This function is performed by the take-up and is in the present instance participated in by the rack-bar 271, which latter, it will be remembered, is advanced or raised one degree each time the character-feed is operated.

Secured to the shaft 220 of the justification-feed is a ratchet-wheel 290, and in proximity thereto, but loose upon said shaft, is a disk 291, carrying a spring-pressed pawl 292, engaging the teeth of the ratchet-wheel. The disk 291 is slotted for the reception of a pin 293, Figs. 23, 24, carried by the rack-engaging wheel 270. The length of this slot in disk 291 is proportionally equal to the predetermined number of feed movements—say seventeen—performed by the two feeds acting in unison, so that the movement of the driving-member wheel 270 in either direction will exceed that of the driven-member disk 290 in the same degree that the total number of movements of the character-feed exceeds those of the justification-feed. Normally the pin 293 occupies a position at one end of the slot, as shown in Fig. 24, and in order to retain the disk in position while the pin is traversing the slot a spring-pawl 294 is arranged to bear upon the periphery and enter shallow notches 295 therein. The primary function of this mechanism is to effect a feeding movement of the justification-feed shaft 220 after the line has been completed and the justification-perforations inserted at the beginning thereof, and this is accomplished by and during the return motion of rack-bar 271 after its elevation in the manner described. As the rack-bar is upheld by the feeding and holding pawls 268 and 264 of its ratchet mechanism, the withdrawal of said pawls, together with section 248 of the locking-pawl of the justification-feed, will permit the descent of said rack-bar either under the influence of gravity alone or, preferably, of a motor 296, Fig. 16, thereby reversing the motion of wheel 270. During this return motion of the wheel its pin 293 traverses the slot in disk 291 without communicating motion to the latter until it contacts with the end of the slot, thereby, in effect, suppressing a number of the feed movements equal to the number of simultaneous movements of the character and justification feeds communicated to the rack-bar during its elevation. The continued movement of the gear-wheel will thereafter be communicated to the disk and transmitted by the latter to the shaft 220, thereby causing the justification-feed to take up the slack in the strip, and thus reëstablish initial conditions.

The tripping of the pawls 268, 264, and 248 is preferably automatically effected simultaneously with the resetting of the indicating devices, to which end the following arrangement of parts is provided. The tail of feed-pawl 268 projects beneath the tail of holding-pawl 264, Fig. 16, in position to engage the latter when the former is elevated by a rod 297, mounted in guides on the frame and engaging an arm 298, secured to shaft 280, Figs. 26, 27. Another arm 299 on shaft 280 engages a rod 300, whose upper end is in position to engage the tail of section 248 of the locking-pawl. Shaft 280 is also provided with an arm 301, Figs. 6 and 26, in position to engage an arm 302, attached to latch 284, when said shaft is turned in a direction to raise the disengaging-rods 297 and 300, whereby the latch will be raised from contact with the pin on bell-crank 281, permitting the latter to be restored by its spring to initial position. The rocking of shaft 280 is produced through the agency of a piston connected to an arm 303 on said shaft and working in a cylinder 304 in communication with the resetting-motor 48 of the indicating mechanism, so that when the resetting-key is depressed both shafts 44 and 280 will be turned in their bearings. A spring 305 serves to return the shaft after the pressure in the cylinder is cut off.

As before mentioned, the rack-bar 271 is preferably provided with a motor 296 to effect and regulate its movement in taking up slack. The motor shown comprises a piston 306, connected to the rack-bar and working in a cylinder 307. Pressure is admitted to this cylinder above the piston through a duct 308, communicating with the cylinder of the resetting-motor 41 or to the supply-pipe leading thereto at a point beyond the one-way throttling-valve, so that the admission of pressure to the resetting-motor will also admit pressure to the motor of the take-up.

It only remains to describe the speed-control connection, whose principal function is to render the casting-machine responsive to a diminution in the quantity of record-strip supplied by the keyboard, thereby avoiding the necessity for and the evils incident to an attempt to synchronize those mechanisms. It is obvious that the kind and character of the control mechanism will depend largely upon special conditions, such as the kind of motor and the means adopted for effecting control, and in the present instance an embodiment of the principle is illustrated in connection with an electric motor 310, Fig. 2, for driving the casting mechanism, conventional figures being employed for the purpose. To the motor is connected a rheostat or speed-controlling device or apparatus 311, Figs. 2 and 12, of any known or approved form and construction, that shown being provided with a movable switch-arm 312, arranged to engage successively each of a series of contacts 313 for regulating the speed of the motor by varying the resistance either of the main or a shunt circuit.

Intermediate the justification and casting-machine feeds and in position to engage the record-strip extending from one to the other is a roller 314, Figs. 1 and 26, supported on arms 315, attached to a shaft 316, the latter provided with a crank-arm 317, to which is attached one end of a link 318, whose opposite end is connected to a crank-arm on shaft 319. This shaft 319 is provided with two slotted crank-arms, the one, 320, engaging a pin on the switch-arm 312 and the other, 321, connected to a dash-pot 322. When the parts are in normal operative position, the record-strip depends in a loop between the justification and casting-machine feeds, as indicated in Fig. 26, the roller 314 being in its lowermost position and supported by the contact of its carrying-arms with suitable bearings on the frame, while the switch-arm 312 engages a contact at one extreme of the series 313, said contact representing maximum speed of the casting-machine. So long as the loop of material beneath roller 314 is maintained at or above a minimum amount, which latter is determined by the angular relation of the roller to the two feeds, the maximum speed of the casting-machine will be preserved; but should the rate of supply at the keyboard mechanism fall below the consumption at the casting-machine the roller 314 will be displaced, thereby shifting the switch-arm or other speed-controlling media to cut down the speed of the casting-machine, relieving the tension upon the record-strip and preventing rupture of the same or the derangement of the keyboard mechanism. Further than this, a skilful operator may be able to manipulate the keyboard more rapidly than the casting-machine can receive the record-strip, in which event he can gradually accumulate a surplus supply sufficient in quantity to enable him to leave the machine for an interval and attend to other matters without thereby interrupting or in any manner interfering with the production of type, and with the assurance that if detained for a longer interval the casing-machine will automatically be slowed down and finally brought to a standstill without rupturing the record-strip or disturbing the feeding devices of the keyboard. This is an important point, for should the position of the record-strip be changed either at the justification-feed or at the character-feed it would result in the production of a false record affecting one or two lines and the loss at the casting-machine of a corresponding period of time and material.

The operation of the machine as a whole may be briefly summarized as follows: In starting up the machine the end of the strip is reduced in width, so that it can be threaded through the tension device 217 and conducted beyond the engaging members of the character and justification feeds, after which one or more keys of the keyboard are actuated a number of times to initiate the formation of marginal feeding perforations and effect engagement and register of the strip with the pin-wheels of the two feeding mechanisms. The resetting-key being now actuated it restores the various mechanisms to their normal or initial positions, and the apparatus is in condition for operation. The keys representing the characters, spaces, &c., of a line are successively actuated in the order in which the type occur in composition, and as the end of the line is reached the operator, observing the justification indication, actuates the appropriate or designated justification-keys, then presses the resetting-key to restore the line-indicator and justification-indicator to zero and proceeds with the composition of the next succeeding line. The depression of each character-key and the elevation of its punch or punches admits pressure to the cylinders connected to the actuating-rods 186 and 246 of the character and justification feeds, thereby retracting the feeding-pawls preliminary to the feed movements, the latter taking place upon the return of the key. Coincident with the retraction of the two feeding-pawls the take-up rack 271 and the cut-out 260 are advanced one degree or measure. This double-feed action and advance of the cut-out and take-up is repeated for each character-key until the predetermined number—say fifteen—have been depressed, at which time the cut-out 260 will be brought into engagement with wheel 261 on shaft 220, thereby arresting the justification-feed with the first character-perforation for the line two feed-measures distant from the justification-punches—that is, with the space for the first justification perforations opposite the justification-punches. The successive depression of subsequent character-keys actuates the character feed and take-up, as before, causing the record-strip to be suspended in a loop between the two feeds. When the line is completed and the key is depressed to actuate the justification-punches, the rocking bar 206, overlying the justification-punch levers, acting through arm 238 and lever 281, withdraws the lock-out 260, so that both feeds will again be actuated to advance the strip. This double feed also takes place when the second justification-signal is formed, thereby completing the record for a single line, with the justification perforations or signals for the entire line located in advance of the character signals or perforations, the lock-out being restrained by latch 284. The resetting-key is now actuated to admit pressure to the resetting-cylinder 41 and return the indicators to zero preparatory to composing the next line. When this takes place, pressure is admitted to cylinder 304, thereby effecting an oscillation of the trip-shaft 280, resulting in the withdrawal of the locking-pawl 248 of the justification-feed, thus rendering the latter free to advance, and the withdrawal of the actuating and holding pawls 268 and 264 of the take-up-advancing mechanism leaving the latter free to be returned to initial position. At the same time pressure is admitted to cylinder 307 to effect the return of the take-up rack 271. During the return of said take-up it operates, through pin 293, slotted pawl-disk 291, and ratchet-wheel 290, to advance the justification-feed shaft through the whole number of degrees of feed movement applied to the take-up during the composition of the line less the number performed by the character and justification feeds when acting in concert. Thus in the example given the action of the take-up will equal the whole number of feeds performed by the character-feed less seventeen, the latter number representing the interval between the two sets of punches, together with the two feed movements incident to justification, for which allowance is made in the slot-and-pin connection 291 293, with the result that the surplus strip between the two feeds is taken up and the strip drawn taut, with the portion above the justification-punches seventeen degrees of feed movement distant from the character-punches. As the lock-out engages at the fifteenth feed movement, the justification-feed will be suspended when the second section in advance of that above the character-punches arrives above the justification-punches, and as the two sections beyond the character-punches are blank, having passed said punches while the justification-punches for the preceding line were acting, this brings the strip in proper position for locating the justification-perforations in these two blank sections when the justification-keys are manipulated.

The employment of a speed-controller in connection with composing and casting machines forms the subject of my divisional application of February 3, 1902, Serial No. 92,468, hence is not claimed herein.

Having thus described my invention, what I claim as new, and desire to secure by Letters Patent, is—

1. In a composing-machine the combination with a record-strip-composing mechanism or keyboard provided with character and justification punches, of independent feeds for said two varieties of punches; two sets of keys controlling the character and justification punches and feeds respectively; and a cut-out controlled by the character-keys and operating to arrest the movement of the justification-feed after the formation of a predetermined series of character-perforations; substantially as described.

2. In a composing-machine such as described, the combination with a record-strip-composing mechanism or keyboard provided with character and justification punches, of independent feeds for each set of punches with actuating mechanism therefor; a lock-out for suspending the action of one of said feeds; and a take-up for effecting the withdrawal of slack between the feeds after the completion of each line, to restore initial conditions preparatory to the formation and delivery of the next succeeding line.

3. In a composing mechanism or keyboard for type-casting machines such as described, the combination of the following elements, to wit: a series of character-punches; a feed pertaining to said punches; a series of justification-punches removed from said character-punches; a feed pertaining to said justification-punches; and a take-up acting through the justification-feed to advance the strip after the justification perforations have been produced.

4. In a record-strip-composing mechanism or keyboard such as described, the combination of the following elements, to wit: a series of character-punches; a character-feed; a series of justification-punches; a justification-feed; a variable actuating mechanism for effecting simultaneous and separate movements of the said two feeds; and a lock-out for the justification-feed for suspending its action after a predetermined number of feed movements.

5. In a record-strip-composing mechanism or keyboard the combination of the following elements, to wit: a series of character-punches; an independent series of justification-punches; individual feeds for each of said series of punches; a lock-out for the justification-feed; and a take-up mechanism operating through the justification-feed to take up or draw off the accumulation of strip between the two feeds due to the suspension of the justification-feed.

6. In a record-strip-composing machine the combination of the following elements, to wit: a series of character-punches provided with a paper-feed; a series of justification-punches provided with an independent feed; actuating mechanism for the said independent feeds; and a lock-out for the justification-feed connected to the actuating devices of the character-feed to suspend the action of the justification-feed after a predetermined number of feed movements of the character-feed.

7. In a record-strip-composing machine the combination of the following elements, to wit: a character-feed; a justification-feed; a lock-out for the justification-feed; a take-up mechanism operating through the justification-feed; independent actuating mechanism for each of said feeds and an intermittent feed for the lock-out and take-up.

8. In a record-strip-composing machine containing character and justification punches, independent feeds therefor, and a lock-out for the justification-feed, and in combination therewith, an actuating or setting mechanism for the lock-out including a spring-actuated lock-bar, a rack-bar engaged by said lock-bar to restrain its motion, and an intermitting feed mechanism driven from the character-feed-actuating devices for advancing the said rack-bar each time the character-feed is actuated, to arrest the justification-feed at any predetermined number of movements of the character-feed.

9. In a record-strip-composing machine or keyboard such as described, the combination with character and justification punches, independent feeds therefor, and a lock-out for the justification-feed, of a take-up provided with an intermittent actuating or setting mechanism for measuring the feed movements of the character-feed; substantially as described.

10. In a record-strip-composing mechanism or keyboard the combination with the character and justification feeds, a lock-out for the justification-feed, and a take-up, of actuating or measuring devices controlling the application of the lock-out and the extent of effective movement of the take-up; substantially as described.

11. In a record-strip-composing mechanism or keyboard, the combination with the character and justification feeds, a lock-out for the justification-feed and a take-up, of an actuating or measuring mechanism connected to the character-feed or the actuating devices therefor and controlling the engagement of the lock-out and the extent of the take-up action; substantially as described.

12. In a record-strip-composing machine or keyboard containing character and justification punches, an independent feed for each set of punches, and a lock-out for the justification-feed, and in combination therewith, a take-up and an actuating mechanism therefor the latter including the following elements, to wit: a movable member—such as the rack-bar; a ratchet mechanism engaging said movable member to shift it one degree each time the character-feed is actuated, thereby measuring the feed movements; a connection intermediate said movable member and the justification-feed, permitting limited independent movement; trip devices for releasing said movable member; and a motor for returning the movable member to initial position, and in so doing advance the justification-feed; substantially as described.

13. In a record-strip-composing machine or keyboard the combination with independent feeds for the strip, a lock-out for one of said feeds, a take-up and an actuating or setting mechanism for measuring the degree of take-up motion.

14. In a record-strip-composing machine or keyboard, the combination with two sets or series of punches arranged in sequence and an independent feed for each set of punches, of a cut-out and a take-up connected to one of said feeds and a feed device or controller for measuring the time of application of the lock-out and the extent of movement of the take-up; substantially as described.

15. In a record-strip-composing machine or keyboard the combination of the following elements, to wit: a series of key-controlled character-punches and a feed mechanism; a series of key-controlled justification-punches and a feed mechanism; an indicating mechanism responding to the keys of the character-punches and designating the keys of the justification-punches; a lock-out for the justification-feed set or adjusted by the action of the character-keys; and a take-up whose measured movements are governed by both character and justification keys; substantially as described.

16. In a record-strip-composing machine or keyboard the combination of the following elements, to wit: a series of key-controlled character-punches and associated feed mechanism; a series of key-controlled justification-punches and associated feed mechanism; an indicating mechanism responding to the character-keys and designating the justification-keys; a lock-out for the justification-feed set or adjusted from the character-keys; and a take-up set or adjusted from both character and justification keys and operating to advance the justification-feed a distance equal to the total character-feed movements minus a predetermined number of such movements.

17. In a record-strip-composing machine or keyboard the combination of the following elements, to wit: key-controlled character-punches and a feed; key-controlled justification-punches and a feed; an indicating mechanism responsive to the character-keys; a resetting-key and connections for the indicating mechanism; a lock-out for the justification-feed controlled from the character-keys; a take-up adjusted from both character and justification keys; and a release mechanism for the take-up and lock-out controlled by the resetting-key; substantially as described.

18. In a record-strip-composing machine or keyboard the combination of the following elements, to wit: key-controlled character-punches and a feed; key-controlled justification-punches and a feed; an indicating mechanism responsive to the character-keys; a resetting-key for the indicating mechanism; a lock-out for the justification-feed; and a take-up provided with a motor controlled from the resetting-key.

19. In a record-strip-composing machine or keyboard the combination of the following elements, to wit: two independent feeds—character and justification—each provided with an actuating mechanism; two series of keys—character and justification—each controlling both of said feed-actuating mechanisms; and a lock-out set or adjusted by the actuating mechanism of one feed and acting upon the other to suspend its action; substantially as described.

20. In a record-strip-composing machine or keyboard the combination of the following elements, to wit: two independent feeds—character and justification—each provided with an actuating mechanism; a lock-out set or adjusted by the actuating mechanism of one feed and acting upon the other to suspend its action after a predetermined number of feed motions and a take-up also set or adjusted by the actuating mechanism of one feed and acting upon the other feed to take up the slack between the two feeds occasioned by the interruption of one of said feeds; substantially as described.

21. In a record-strip-composing machine or keyboard the combination with the character and justification punches and their independent feeds, of a lock-out for the justification-feed comprising the following elements, to wit: a rack-bar; an intermittent driving mechanism connected to the actuating devices of the character-feed and engaging said rack-bar, to advance the latter at each movement of the character-feed; and a lock-bar engaged by the rack-bar and movable therewith into engagement with the justification-feed.

22. In a record-strip-composing machine or keyboard the combination with the character and justification feeds, of a lock-out and take-up for the justification-feed comprising the following elements, to wit: a rack-bar movable in guides; an actuating mechanism connected thereto and driven from the actuating devices of the character-feed; a lock-bar controlled by said rack-bar in its movements toward the justification-feed to lock the latter; and a slotted pawl-carrier engaging the justification-feed and engaged by a pin moving in unison with said rack-bar; substantially as described.

23. In a record-strip-composing machine or keyboard such as described provided with independent character and justification feeds, a lock-out for the justification-feed and justification-punches, of connections intermediate said punches and the lock-out for withdrawing the latter when a justification-punch is operated; substantially as described.

24. In a record-strip-composing machine or keyboard such as described, the combination with the lock-out for the justification-feed, of the bell-crank controlled by the justification-keys and engaging the lock-out to withdraw the latter, and a lock for retaining said bell-crank in retracted position, as and for the purpose specified.

25. The combination with the justification-punches, the feed therefor, and the lock-out, of a release mechanism responding to the movement of any justification-punch and acting upon the lock-out to withdraw the latter and permit movement of the justification-feed; substantially as described.

26. The combination with the justification-punches, the feed therefor, the lock-out, and key-controlled actuating mechanism for said punches, and feed, of a lock-out retractor responding to the movement of the punch-actuating mechanism, a lock for said retractor, and a key-controlled release for said lock.

27. In a record-strip-composing machine or keyboard such as described provided with independent character and justification punches and separate feeds therefor, the combination therewith of separate motors for the two feeds and a single controller or valve responding to the action of both sets of punches; substantially as described.

28. The combination with the character and justification punches, their individual feeds, and actuating devices, of the single control-valve for the two feed-motors, and means for actuating said control-valve from either set of punches; substantially as described.

29. In a record-strip-composing machine or keyboard the combination with the character-punches, of a feed provided with radial punches and a rotary die with which said radial punches engage to form the feeding-perforations for the strip; substantially as described.

30. In a record-strip-composing machine or keyboard the combination with the character-punches, of a feed provided with a rotating member located at each end of the series of punches and furnished with radial punches, a series of dies mounted upon a rotating support opposite each series of radial punches and engaged thereby, and a tension device engaging the strip; substantially as described.

31. The combination with the justification-feed, the lock-out therefor, the take-up mechanism, and the ratchet-actuating devices for said feed and take-up, of the tripping or releasing mechanism comprising a retractor engaging the lock-out, a trip for the take-up ratchet mechanism, and a trip for the feed-actuating mechanism, said lock-out retractor being actuated by the justification-punches and said trips by a motor controlled from a key; substantially as described.

32. The combination with the shaft controlling the tripping devices of the justification-feed-actuating mechanism and the lock-out-actuating mechanism and the retractor or bell-crank for releasing the lock-out, of the latch engaging said retractor and the arm carried by said shaft for engaging said latch when said tripping devices are operated; substantially as described.

33. The combination with a feed-shaft, such as that of the justification-feed, provided with a toothed wheel and a ratchet-wheel fast thereon, of a slotted pawl-carrier or disk whose pawl engages said ratchet-wheel; a ratchet mechanism and a gear-wheel driven thereby, the latter carrying a pin riding in the slot of the pawl-carrier; a lock-bar for engaging the toothed wheel fast on the feed-shaft; and a rack-bar driven by the gear of the ratchet mechanism and engaged by the lock-bar to limit the approach of the latter to its wheel, substantially as and for the purpose specified.

34. The combination with the ratchet-driving mechanism of the justification-feed, of the sectional locking-pawl and a trip device contacting with one section thereof, to withdraw the engaging section and release the feed so that it can advance under the influence of the take-up mechanism; substantially as described.

35. In a record-strip-composing machine or keyboard such as described, the combination of the following elements, to wit: a series of character-punches, actuating devices, and a feed; a series of justification-punches, with actuating devices and a feed; an indicating mechanism and actuating devices therefor; a series of keys controlling the actuating devices of the indicating mechanism and of the character-punches; a series of keys controlling the actuating devices of the justification-punches; a key controlling the resetting of the indicating mechanism; a lock-out and take-up for the justification-feed; and a motor for the take-up controlled by said resetting-key.

36. In a take-up for record-strip-composing machines or keyboards such as described, the combination with the slotted pawl-carrier or disk, the feed mechanism, the propelling rack-bar, and the pinion engaging the rack-bar and provided with a pin for engaging opposite walls of the slot in the pawl-carrier, of a detainer, such as the spring-pawl, engaging the pawl-carrier for detaining the latter while the pin is traversing the interval between the engaging surfaces; substantially as described.

37. In a record-strip-composing machine or keyboard such as described, and in combination with the chart-carrying devices provided with main and supplemental motors, of a lock engaging the supplemental-motor-actuated devices, and means for unlocking the same at a predetermined point in the traverse of the main motor; substantially as described.

38. In a record-strip-composing machine or keyboard such as described, and in combination with the chart-carrying devices and the main and supplemental motors acting thereon, of a lock for retaining the chart in position preliminary to the engagement of the main motor, the same including a locking-pin and a motor therefor the latter controlled by the piston of the main motor; substantially as described.

39. In a record-strip-composing machine or keyboard, such as described, and in combination with the chart-carrying mechanism of the indicating devices, and the main motor, of a lock for the chart-carrying mechanism when disconnected, temporarily, from the main-motor devices, the same comprising a bolt arranged to project into the path of a portion of the chart-carrying mechanism; a piston working in a cylinder and connected to said bolt; and a supply duct or passage communicating with said cylinder and with the cylinder of the main motor for effecting the withdrawal of the lock when the piston of the main motor passes a predetermined point and the driving devices connected therewith are about to engage the chart-carrying mechanism, as and for the purpose described.

40. In a composing-machine and as a means for controlling the traverse of a strip or ribbon with relation to two fixed points in the line of its motion, the combination of two independent feeds arranged for simultaneous and dissimultaneous action, a cut-out for automatically arresting one of said feeds, and an automatic take-up set or adjusted to advance the arrested feed as many units as the one feed is operated in excess of the other; substantially as described.

TOLBERT LANSTON.

Witnesses:
JOSEPH B. CHURCH,
LOUIS CALMES TECK.